(12) United States Patent
Guo et al.

(10) Patent No.: US 11,861,045 B2
(45) Date of Patent: Jan. 2, 2024

(54) METHOD, ELECTRONIC DEVICE, AND COMPUTER PROGRAM PRODUCT FOR SYSTEM FEATURE MANAGEMENT

(71) Applicant: DELL PRODUCTS L.P., Round Rock, TX (US)

(72) Inventors: Yongsheng Guo, Shanghai (CN); Min Liu, Shanghai (CN); Yubing Zhang, Shanghai (CN); Zhihong Zeng, Shanghai (CN); Mengze Liao, Shanghai (CN)

(73) Assignee: DELL PRODUCTS L.P., Round Rock, TX (US)

( * ) Notice: Subject to any disclaimer, the term of this patent is extended or adjusted under 35 U.S.C. 154(b) by 57 days.

(21) Appl. No.: 17/731,924

(22) Filed: Apr. 28, 2022

(65) Prior Publication Data

US 2023/0274031 A1    Aug. 31, 2023

(30) Foreign Application Priority Data

Feb. 25, 2022 (CN) .......................... 202210179863.4

(51) Int. Cl.
*G06F 21/62* (2013.01)
*G06F 21/10* (2013.01)

(52) U.S. Cl.
CPC .......... *G06F 21/629* (2013.01); *G06F 21/105* (2013.01); *G06F 21/1011* (2023.08)

(58) Field of Classification Search
CPC ... G06F 21/629; G06F 21/105; G06F 21/1011
(Continued)

(56) References Cited

U.S. PATENT DOCUMENTS 10,841,070 B2 * 11/2020 Smee .................. H04L 5/16
2015/0339004 A1 * 11/2015 Haydn ................ G06F 9/451
715/825

(Continued)

FOREIGN PATENT DOCUMENTS

WO    WO-2018174857 A1 * 9/2018 .............. G06F 3/06

OTHER PUBLICATIONS

Maruf et al., "Facilitating Reuse of Functions in Embedded Software," in IEEE Access, vol. 10, pp. 88595-88605, 2022, doi: 10.1109/ACCESS.2022.3197656. (Year: 2022).*

(Continued)

*Primary Examiner* — Peter C Shaw
(74) *Attorney, Agent, or Firm* — WOMBLE BOND DICKINSON (US) LLP (57) ABSTRACT

Embodiments of the present disclosure relate to a method, an electronic device, and a computer program product for system feature management. The method for system feature management provided by the embodiments of the present disclosure includes loading a feature item set including multiple feature items, where the multiple feature items respectively correspond to multiple microservices, the feature items each include at least an availability indicator and a status indicator, the availability indicator indicates whether the feature item is available, and the status indicator indicates whether the feature item is enabled while the feature item is available; and disabling a first feature item in the feature item set in response to an availability indicator of the first feature item indicating that the first feature item is unavailable. In this way, software can be made to better adapt to more platforms. Moreover, a user can choose to enable or disable some services as required, thereby reducing energy consumption.

20 Claims, 5 Drawing Sheets

(58) Field of Classification Search
USPC .......................................................... 726/27
See application file for complete search history.

(56) References Cited

U.S. PATENT DOCUMENTS

| 2016/0210031 A1* | 7/2016 | Wippler | B60K 37/02 |
| 2019/0104034 A1* | 4/2019 | Myneni | H04L 43/062 |
| 2020/0090525 A1* | 3/2020 | Krishnamoorthy | G06Q 50/30 |
| 2022/0027519 A1* | 1/2022 | Kataria | G06F 21/71 |

OTHER PUBLICATIONS

Ohnishi et al., "Visual software requirements definition environment," Proceedings Twenty-First Annual International Computer Software and Applications Conference (COMPSAC'97), Washington, DC, USA, 1997, pp. 624-629, doi: 10.1109/CMPSAC.1997.625083. (Year: 1997).*

Xu et al., "The Analysis on the Design of 3D Graphic Software Icons," 2009 WRI World Congress on Computer Science and Information Engineering, Los Angeles, CA, USA, 2009, pp. 379-385, doi: 10.1109/CSIE.2009.131. (Year: 2009).*

Tschernuth et al., "A combined approach for feature driven user interface prototyping," 2012 IEEE International Conference on Pervasive Computing and Communications Workshops, Lugano, Switzerland, 2012, pp. 395-398, doi: 10.1109/PerComW.2012.6197518. (Year: 2012).*

* cited by examiner

```
<Feature id="VM_DIRECT" name="VM protection and restore" available="true" status="ENABLED" boardservice="true" vdm="">
  <APIRules>
    <APIRule uriPatterns="/api/v2/inventory-source/*">
      <Filters>
        <Filter type="FIELD" name="&:type" value="VCENTER"/>
        <Filter type="METHOD" value="POST,PUT"/>
      </Filters>
    </APIRule>
    <APIRule uriPatterns="/api/v2/inventorySources/*">
      <Filters>
        <Filter type="FIELD" name="&:type" value="VCENTER"/>
        <Filter type="METHOD" value="POST,PUT"/>
      </Filters>
    </APIRule>
    ...
  </APIRules>
</Feature>
```

METHOD, ELECTRONIC DEVICE, AND COMPUTER PROGRAM PRODUCT FOR SYSTEM FEATURE MANAGEMENT

CROSS-REFERENCE TO RELATED APPLICATION

This patent application claims priority, under 35 U.S.C. § 119, of Chinese Patent Application No. 202210179863.4, filed Feb. 25, 2022, which is incorporated by reference in its entirety.

TECHNICAL FIELD

Embodiments of the present disclosure relate to the field of computers, and more particularly, to a method, an electronic device, and a computer program product for system feature management.

BACKGROUND

With the widespread use of software such as PowerProtect Data Manager (PPDM), such software may be used not only for data protection. Such software may run on multiple platforms (such as a local virtual machine, a public cloud, and a cloud virtual machine) for more generalized use purposes. Some features in the PPDM may not be supported on some platforms. Microservice is a manner of software architecture, and software may be composed of small independent services that communicate through well-defined application programming interfaces (APIs).

SUMMARY OF THE INVENTION

In a first aspect of the present disclosure, a method for system feature management is provided. The method includes loading a feature item set including multiple feature items, where the multiple feature items respectively correspond to multiple microservices, the feature items each include at least an availability indicator and a status indicator, the availability indicator indicates whether the feature item is available, and the status indicator indicates whether the feature item is enabled while the feature item is available. The method further includes disabling a first feature item in the feature item set in response to an availability indicator of the first feature item indicating that the first feature item is unavailable.

In a second aspect of the present disclosure, an electronic device is provided. The electronic device includes a processor and a memory coupled to the processor, the memory having instructions stored therein which, when executed by the processor, cause the device to perform actions. The actions include loading a feature item set including multiple feature items, where the multiple feature items respectively correspond to multiple microservices, the feature items each include at least an availability indicator and a status indicator, the availability indicator indicates whether the feature item is available, and the status indicator indicates whether the feature item is enabled while the feature item is available. The actions further include disabling a first feature item in the feature item set in response to an availability indicator of the first feature item indicating that the first feature item is unavailable.

In a third aspect of the present disclosure, a computer program product is provided. The computer program product is tangibly stored on a computer-readable medium and includes machine-executable instructions, wherein the machine-executable instructions, when executed, cause a machine to perform the method according to the first aspect.

The Summary of the Invention part is provided to introduce the selection of concepts in a simplified form, which will be further described in the Detailed Description below. The Summary of the Invention part is neither intended to identify key features or main features of the present disclosure, nor intended to limit the scope of the present disclosure.

BRIEF DESCRIPTION OF THE DRAWINGS

By more detailed description of example embodiments of the present disclosure with reference to the accompanying drawings, the above and other objectives, features, and advantages of the present disclosure will become more apparent, where identical reference numerals generally represent identical components in the example embodiments of the present disclosure. In the accompanying drawings.

DETAILED DESCRIPTION

The principle of the present disclosure will be described below with reference to several example embodiments illustrated in the accompanying drawings. Although the drawings show preferred embodiments of the present disclosure, it should be understood that these embodiments are merely described to enable those skilled in the art to better understand and further implement the present disclosure, and not to limit the scope of the present disclosure in any way.

The term "include" and variants thereof used herein indicate open-ended inclusion, that is, "including but not limited to." Unless specifically stated, the term "or" means "and/or." The term "based on" means "based at least in part on." The terms "an example embodiment" and "an embodiment" indicate "at least one example embodiment." The term "another embodiment" indicates "at least one additional embodiment." The terms "first," "second," and the like may refer to different or the same objects. Other explicit and implicit definitions may also be included below.

As previously mentioned, some software may be generalized to more platforms for use. When used on multiple platforms, some features in the software may not be supported on some platforms. Unsupported features need to be disabled or hidden for specific platforms. Otherwise, it will bring bad user experience during use. Because the user will not know whether this is a bug or because it is not supported. However, there are too many features running in software, and there are also many supporting platforms. If there is no unified method to manage the feature availability, the user interface (UI) will be troubled by a lot of code logic.

Moreover, if enabled states of certain features need to be modified in the future (for example, a client terminal purchases a different license, or the client terminal enables or disables certain features as needed), the UI code will have to be modified and refactored.

A solution for system feature management is proposed in the embodiments of the present disclosure, so that features of software can be managed in a unified manner. According to various embodiments of the present disclosure, a feature item set is loaded, and the feature item set includes multiple feature items respectively corresponding to multiple microservices. In response to an availability indicator of a first feature item indicating that the first feature item is unavailable, the first feature item is disabled.

According to the embodiments described herein, software runtime failures may be avoided by disabling, when the software is booted, those features that are not supported by the platform on which the software is running. In this way, software can be made to better adapt to more platforms. In addition, even if the user re-purchases a different service, the operator only needs to enable or disable the corresponding feature item, and does not need to redeploy to the user, thereby saving operating costs. The user may also choose to enable or disable the purchased service according to his/her own needs, so that the resources consumed by microservices running in the backend can be reduced.

The basic principle and some example implementations of the present disclosure will be described below with reference to the accompanying drawings. It should be understood that these example embodiments are given only to enable those skilled in the art to better understand and thus implement the embodiments of the present disclosure, and are not intended to limit the scope of the present disclosure in any way.

Figure 1:
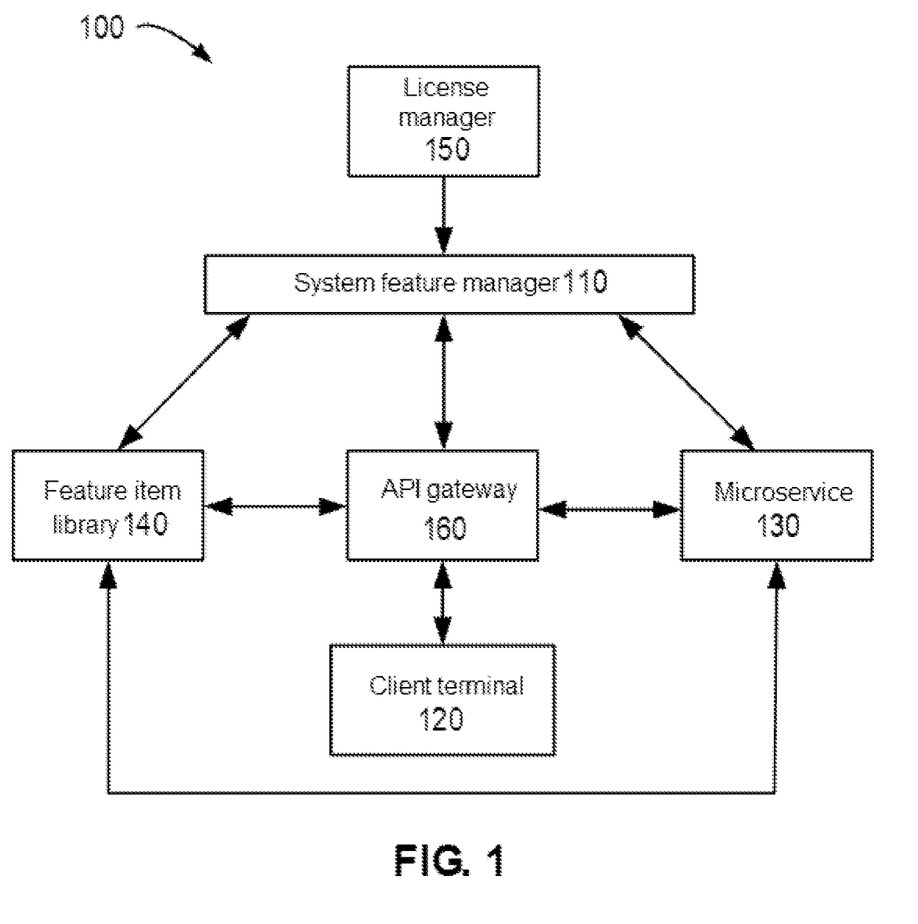
FIG. 1 is a schematic diagram of an example environment in which embodiments of the present disclosure can be implemented.

FIG. 1 is a schematic diagram of an example environment in which embodiments of the present disclosure can be implemented. As shown in FIG. 1, environment 100 includes system feature manager 110, client terminal 120, microservice 130, feature item library 140, and license manager 150. Client terminal 120 may communicate with system feature manager 110, microservice 130, and feature item library 140 through API gateway 160.

Microservice 130 may provide various services to client terminal 120. Although microservice 130 is shown as a whole, it should be understood that this is for ease of illustration only. In fact, microservice 130 may include one or more microservices (collectively or individually referred to as "microservice 130") that may be communicatively coupled to each other and independently deployed. These microservices communicate with each other through a representational layer state transition (REST) API.

Any two of system feature manager 110, microservice 130, and feature item library 140 may communicate with each other. System feature manager 110 may obtain data from license manager 150.

In some embodiments, system feature manager 110 and microservice 130 may be arranged together. In some embodiments, system feature manager 110 and microservice 130 may be arranged separately, but can communicate with each other. The platform on which system feature manager 110 and microservice 130 run may be a local virtual machine, a public cloud, a cloud virtual machine, or the like. The scope of the present disclosure is not limited in this regard.

It should be understood that the structure and functions of environment 100 are described for illustrative purposes only and do not imply any limitation to the scope of the present disclosure. For example, the embodiments of the present disclosure may also be applied to an environment different from environment 100.

Figure 2:
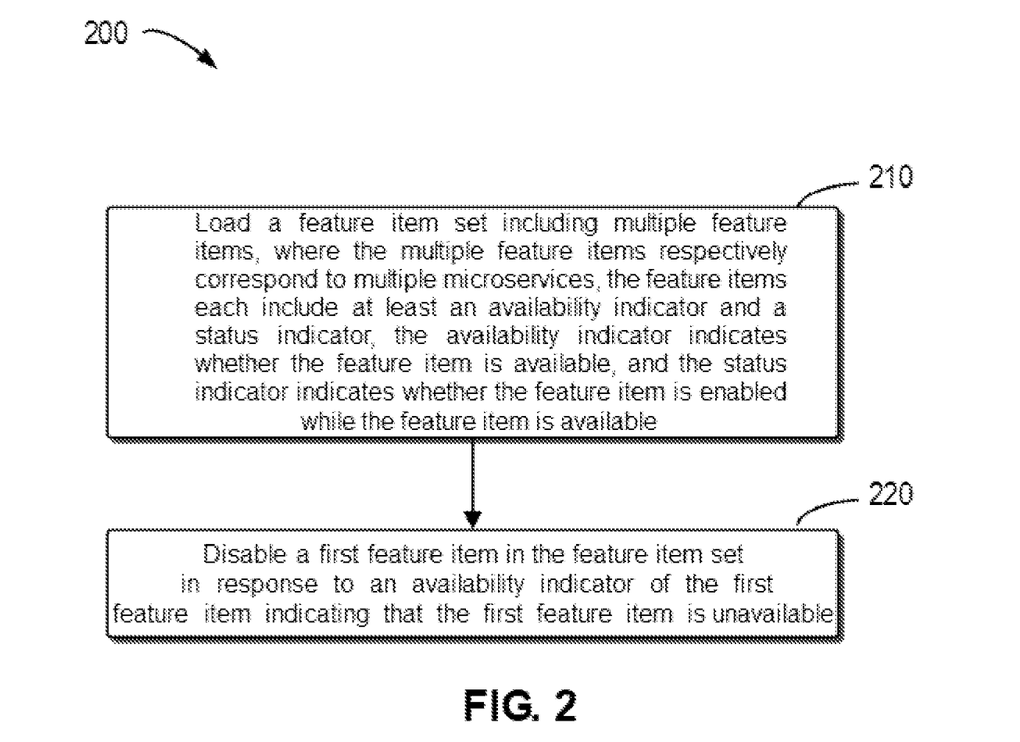
FIG. 2 is a flow chart of an example method for system feature management according to an embodiment of the present disclosure.

FIG. 2 is a flow chart of example method 200 for system feature management according to an embodiment of the present disclosure. For example, method 200 may be performed by system feature manager 110 as shown in FIG. 1. It should be understood that method 200 may also include additional actions not shown and/or may omit actions shown, and the scope of the present disclosure is not limited in this regard. Method 200 will be described in detail below with reference to FIG. 1 and FIG. 3.

Figure 3:
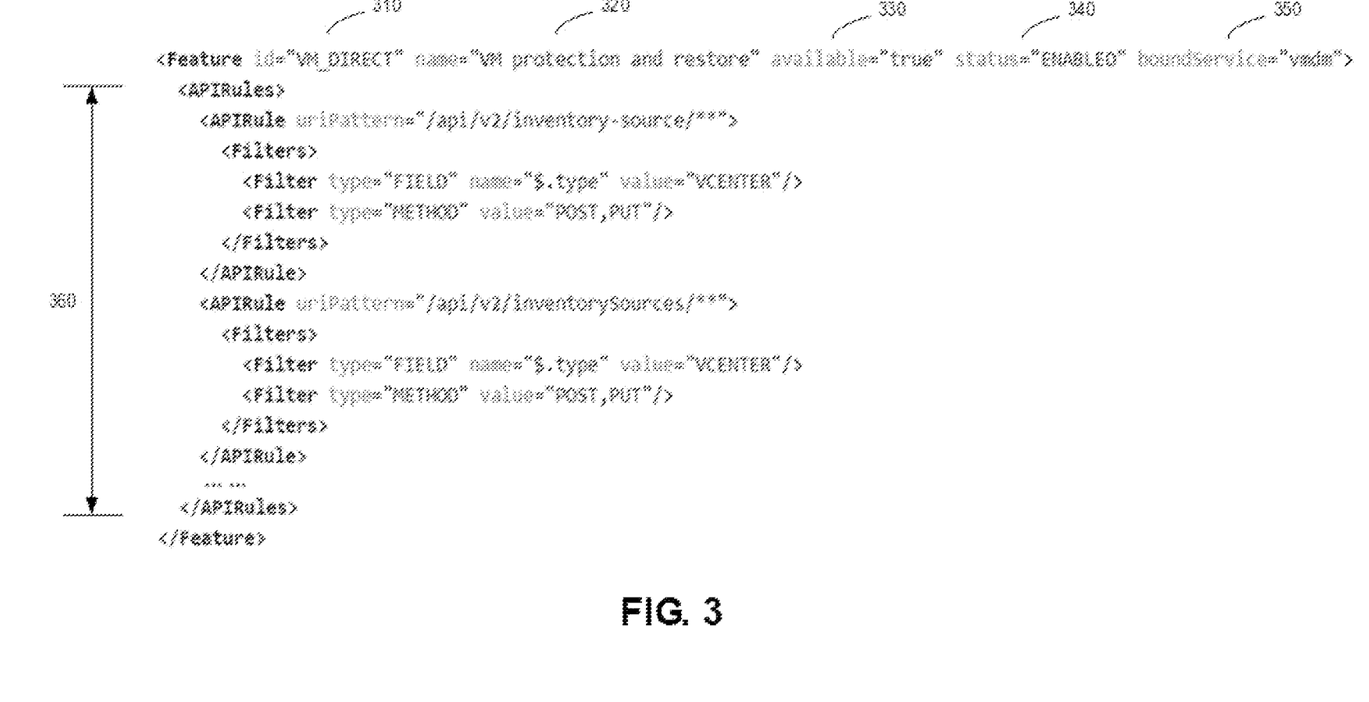
FIG. 3 is a schematic diagram of code defining a feature item according to some embodiments of the present disclosure.

At block 210, system feature manager 110 loads a feature item set that includes multiple feature items corresponding to multiple microservices, respectively. FIG. 3 shows code defining a feature item according to some embodiments of the present disclosure.

As shown in FIG. 3, in some embodiments, a feature item may include feature identifier 310, feature descriptor 320, availability indicator 330, and status indicator 340. Feature identifier 310 is an identifier that can uniquely identify the feature item. Feature descriptor 320 can describe the feature item and may be presented on a user interface in the form of options for presenting the feature item to a user.

Availability indicator 330 indicates whether the feature item is available. For example, if the service purchased by client terminal 120 does not include a microservice corresponding to the feature item, then availability indicator 330 should indicate that it is unavailable. In some embodiments, loading a feature item set may include obtaining license information for the multiple microservices. Then, availability indicators 330 in the feature item set are determined based on the license information. In the embodiment shown in FIG. 3, availability indicator 330 is represented by a field "available," which indicates available when a value thereof equals to "true." Conversely, a value "false" (not shown) may be used for indicating unavailable. In some other embodiments, "true" and "false" or "1" and "0" may be used for indicating available or unavailable, respectively, and the scope of the present disclosure is not limited in this regard.

Back to FIG. 2, at block 220, in response to availability indicator 330 of a first feature item in the feature item set indicating that the first feature item is unavailable, system feature manager 110 disables the first feature item. In this manner, even if the user re-purchases a different service, the operator only needs to enable or disable the corresponding feature item, and does not need to redeploy to the user, thereby saving operating costs.

In some embodiments, in response to status indicator 340 of the first feature item indicating that the first feature item is disabled, system feature manager 110 disables the first feature item.

Status indicator 340 may indicate whether the feature item is enabled while the feature item is available. For example, although the service purchased by client terminal 120 includes the microservice corresponding to the feature item, client terminal 120 may choose to enable or disable the feature item according to actual situation and needs. The enabling or disabling action of client terminal 120 may be transferred as metadata to feature item library 140, and stored as cached data for the feature item set in feature item library 140. In the embodiment shown in FIG. 3, status indicator 340 is represented by a field "status," which indicates enabled when a value thereof equals to "ENABLED." Conversely, a value "DISABLED" (not shown) may be used for indicating disabled. In some other embodiments, "ENABLED" and "DISABLED" or "1" and "0" may be used for indicating enabled or disabled, respectively, and the scope of the present disclosure is not limited in this regard.

In some embodiments, the feature item set may include a platform indicator for indicating the platform for which the feature item set is targeted. Based on the platform indicator of the feature item set, the feature item unsupported by the platform as indicated by the platform indicator is disabled. In this way, software runtime failures may be avoided by disabling, when the software is booted, those features that are not supported by the platform on which the software is running. In this way, software can be made to better adapt to more platforms.

In some embodiments, loading the feature item set may include determining status indicators 340 in the feature item set based on cached data for the feature item set. In this way, the user may choose to enable or disable the purchased service according to his/her own needs, so that the resources consumed by microservice 130 running in the backend can be reduced.

The feature item also includes API rule 360 as shown in FIG. 3, and API rule 360 indicates part of microservice 130 corresponding to the feature item. When a feature item is disabled, part of microservice 130 corresponding to the feature item may be disabled according to the API rule of the feature item. In this way, instead of disabling the entire microservice corresponding to the feature item, part of the services may be selectively disabled, and only some necessary services are retained. Therefore, the energy consumption is reduced while ensuring the normal operation of the software.

In some embodiments, some feature items in the feature item set may include, for example, association indicator 350 in FIG. 3. The association indicator indicates that the feature item is associated with corresponding microservice 130. At this point, if the feature item is disabled, microservice 130 associated with it will be disabled. In this way, because the feature item is associated with corresponding microservice 130, entire microservice 130 can be disabled by disabling the feature item without considering what kind of service is defined by the API rule in the feature item.

There may be dependencies between feature items. That is, microservice 130 corresponding to one feature item or part of this microservice 130 may depend on microservice 130 corresponding to another feature item or part of its service. In some embodiments, a second feature item in the feature item set may include one or more dependency indicators for indicating one or more upper-level feature items on which the second feature item depends.

Figure 4:
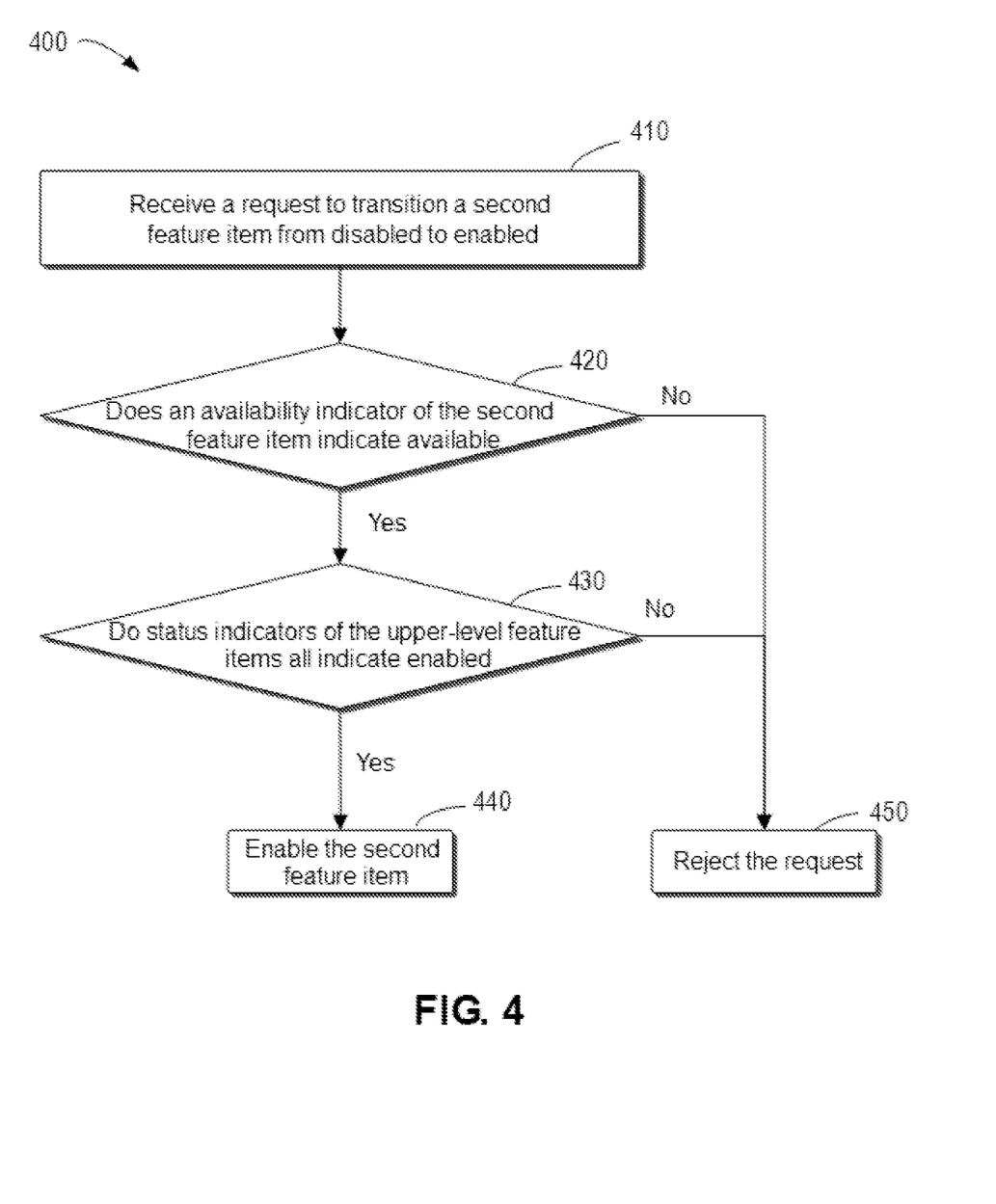
FIG. 4 is a flow chart of an example method of enabling a second feature item depending on upper-level feature items according to some embodiments of the present disclosure.

When the second feature item having upper-level feature items is being enabled, the dependency relationship needs to be considered. FIG. 4 is a flow chart of example method 400 of enabling a second feature item depending on upper-level feature items according to some embodiments of the present disclosure. Method 400 may be performed also by system feature manager 110 as shown in FIG. 1. It should be understood that method 400 may also include additional actions not shown and/or may omit actions shown, and the scope of the present disclosure is not limited in this regard. Method 400 will be described in detail below with reference to FIG. 1 and FIG. 3.

At block 410, system feature manager 110 receives a request to transition the second feature item from disabled to enabled. Then, at block 420, system feature manager 110 determines whether availability indicator 330 of the second feature item indicates available. If availability indicator 330 indicates unavailable ("No" branch), it means that the service corresponding to the second feature item is unavailable (for example, the corresponding service has not been purchased), the second feature item cannot be enabled, and therefore, the request will be rejected by system feature manager 110 at block 450.

If availability indicator 330 of the second feature item indicates available ("Yes" branch), system feature manager 110 determines at block 430 whether status indicators 340 of one or more upper-level feature items of the second feature item all indicate enabled. As long as there is one upper-level feature item whose status indicator 340 indicates disabled, the second feature item cannot be enabled. This is because its corresponding service needs to depend on other services to be implemented. Therefore, the request will be rejected by system feature manager 110 at block 450.

If it is determined that status indicators 340 of the one or more upper-level feature items all indicate enabled, at block 440, system feature manager 110 enables the second feature item.

If an upper-level feature item is a parent feature item with a strong association relationship with the second feature item, the dependency relationship also needs to be considered when the upper-level feature item is disabled. If a request to transition a parent feature item from enabled to disabled is received, because the second feature item is a child feature item thereof, the second feature item, as the child feature item, is also disabled when the parent feature item is disabled. If there is another child feature item of the parent feature item, the another child feature item is also disabled.

If the dependency between the upper-level feature item and the second feature item is weak dependency, the second feature item may or may not be disabled when the upper-level feature item is disabled.

In this way, it can be ensured that enabling or disabling operations of feature items will not cause the features of software to be disordered.

Figure 5:
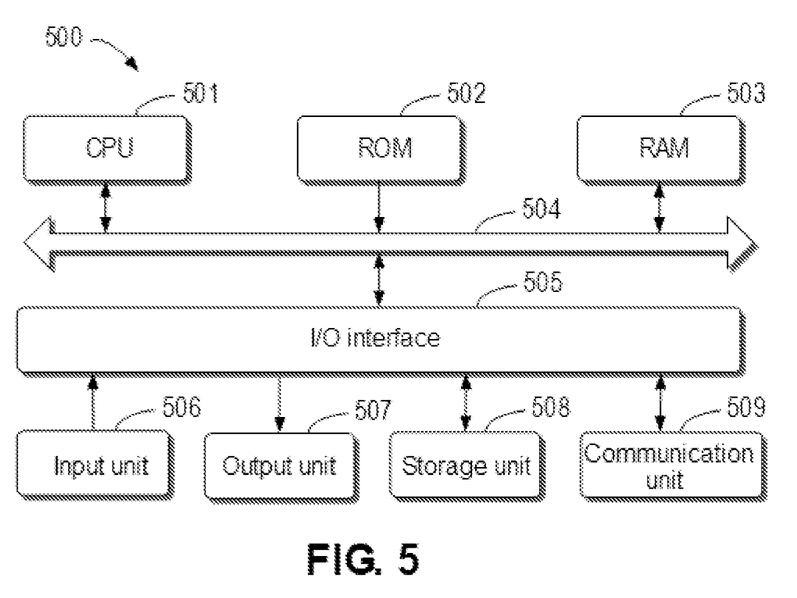
FIG. 5 is a block diagram of an example device that can be used to implement embodiments of the present disclosure.

FIG. 5 is a schematic block diagram of example device 500 that can be configured to implement an embodiment of the present disclosure. For example, system feature manager 110 as shown in FIG. 1 may be implemented by device 500. As shown in FIG. 5, device 500 includes central processing unit (CPU) 501 which may perform various appropriate actions and processing according to computer program instructions stored in read-only memory (ROM) 502 or computer program instructions loaded from storage unit 508 to random access memory (RAM) 503. Various programs and data required for operations of device 500 may also be stored in RAM 503. CPU 501, ROM 502, and RAM 503 are connected to each other through bus 504. Input/output (I/O) interface 505 is also connected to bus 504.

A plurality of components in device 500 are connected to I/O interface 505, including: input unit 506, such as a keyboard and a mouse; output unit 507, such as various types of displays and speakers; storage unit 508, such as a magnetic disk and an optical disc; and communication unit 509, such as a network card, a modem, and a wireless communication transceiver. Communication unit 509 allows device 500 to exchange information/data with other devices via a computer network, such as the Internet, and/or various telecommunication networks.

The various methods and processes described above, such as method 200 and method 400, may be performed by processing unit 501. For example, in some embodiments, method 200 and method 400 may be implemented as a computer software program that is tangibly included in a machine-readable medium, such as storage unit 508. In some embodiments, part of or all the computer program may be loaded and/or installed to device 500 via ROM 502 and/or communication unit 509. One or more actions of method 200 and method 400 described above may be performed when the computer program is loaded into RAM 503 and executed by CPU 501.

The present disclosure may be a method, an apparatus, a system, and/or a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electric storage device, a magnetic storage device, an optical storage device, an electromagnetic storage device, a semi-conductor storage device, or any suitable combination of the foregoing. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in the computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or more programming languages, the programming languages including object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer may be connected to a user computer through any kind of networks, including a local area network (LAN) or a wide area network (WAN), or may be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions to implement various aspects of the present disclosure.

Various aspects of the present disclosure are described here with reference to flow charts and/or block diagrams of the method, the apparatus (system), and the computer program product according to the embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in a reverse order, which depends on involved functions. It should be further noted that each block in the block diagrams and/or flow charts as well as a combination of blocks in the block diagrams and/or flow charts may be implemented by using a special hardware-based system that executes specified functions or actions, or implemented by using a combination of special hardware and computer instructions.

The embodiments of the present disclosure have been described above. The above description is illustrative, rather than exhaustive, and is not limited to the disclosed various embodiments. Numerous modifications and alterations are apparent to persons of ordinary skill in the art without departing from the scope and spirit of the illustrated embodiments. The selection of terms used herein is intended to best explain the principles and practical applications of the various embodiments or the improvements to technologies on the market, or to enable other persons of ordinary skill in the art to understand the embodiments disclosed here.

The invention claimed is:

1. A method for system feature management, comprising:
    loading a feature item set comprising multiple feature items, wherein the multiple feature items respectively correspond to multiple microservices, the feature items each comprise at least an availability indicator and a status indicator, the availability indicator indicates whether the feature item is available, and the status indicator indicates whether the feature item is enabled while the feature item is available; and
    disabling a first feature item in the feature item set in response to an availability indicator of the first feature item indicating that the first feature item is unavailable.

2. The method according to claim 1, wherein disabling the first feature item comprises:
    disabling the first feature item in response to a status indicator of the first feature item indicating that the first feature item is disabled.

3. The method according to claim 1, wherein the feature item further comprises an application programming interface (API) rule, and the API rule indicates part of a microservice corresponding to the feature item, and
    wherein disabling the first feature item comprises: disabling part of a first microservice corresponding to the first feature item according to the API rule of the first feature item.

4. The method according to claim 1, wherein the first feature item further comprises an association indicator indicating that the first feature item is associated with a corresponding first microservice, and
    wherein disabling the first feature item comprises: disabling the first microservice.

5. The method according to claim 1, wherein loading the feature item set comprises:
    acquiring license information for the multiple microservices;
    determining, based on the license information, availability indicators in the feature item set; and
    determining the status indicators in the feature item set based on cached data for the feature item set.

6. The method according to claim 1, wherein a second feature item in the feature item set comprises one or more dependency indicators that indicate one or more upper-level feature items on which the second feature item depends, and the method further comprises:
    determining, in response to receiving a request to transition the second feature item from disabled to enabled, whether an availability indicator of the second feature item indicates available;
    determining, in response to determining that the availability indicator of the second feature item indicates available, whether status indicators of the one or more upper-level feature items all indicate enabled; and
    enabling the second feature item in response to determining that the status indicators of the one or more upper-level feature items all indicate enabled.

7. The method according to claim 6, wherein the upper-level feature items are parent feature items of the second feature item, and the method further comprises:
    disabling the parent feature items and the second feature item in response to receiving a request to transition the parent feature items from enabled to disabled.

8. An electronic device, comprising:
    a processor; and
    a memory coupled to the processor, the memory having instructions stored therein, which when executed by the processor, cause the processor to perform actions, the actions comprising:
    loading a feature item set comprising multiple feature items, wherein the multiple feature items respectively correspond to multiple microservices, the feature items each comprise at least an availability indicator and a status indicator, the availability indicator indicates whether the feature item is available, and the status indicator indicates whether the feature item is enabled while the feature item is available; and
    disabling a first feature item in the feature item set in response to an availability indicator of the first feature item indicating that the first feature item is unavailable.

9. The device according to claim 8, wherein disabling the first feature item comprises:
    disabling the first feature item in response to a status indicator of the first feature item indicating that the first feature item is disabled.

10. The device according to claim 8, wherein the feature item further comprises an application programming interface (API) rule, and the API rule indicates part of a microservice corresponding to the feature item, and
    wherein disabling the first feature item comprises: disabling part of a first microservice corresponding to the first feature item according to the API rule of the first feature item.

11. The device according to claim 8, wherein the first feature item further comprises an association indicator indicating that the first feature item is associated with a corresponding first microservice, and
    wherein disabling the first feature item comprises: disabling the first microservice.

12. The device according to claim 8, wherein loading the feature item set comprises:
    acquiring license information for the multiple microservices;
    determining, based on the license information, availability indicators in the feature item set; and
    determining the status indicators in the feature item set based on cached data for the feature item set.

13. The device according to claim 8, wherein a second feature item in the feature item set comprises one or more dependency indicators that indicate one or more upper-level feature items on which the second feature item depends, and the actions further comprise:
    determining, in response to receiving a request to transition the second feature item from disabled to enabled, whether an availability indicator of the second feature item indicates available;
    determining, in response to determining that the availability indicator of the second feature item indicates available, whether status indicators of the one or more upper-level feature items all indicate enabled; and enabling the second feature item in response to determining that the status indicators of the one or more upper-level feature items all indicate enabled.

14. The device according to claim 13, wherein the upper-level feature items are parent feature items of the second feature item, and the actions further comprise:

disabling the parent feature items and the second feature item in response to receiving a request to transition the parent feature items from enabled to disabled.

15. A computer program product tangibly stored on a computer-readable medium and comprising machine-executable instructions, which when executed by a processor, cause the processor to perform actions, the actions comprising:

loading a feature item set comprising multiple feature items, wherein the multiple feature items respectively correspond to multiple microservices, the feature items each comprise at least an availability indicator and a status indicator, the availability indicator indicates whether the feature item is available, and the status indicator indicates whether the feature item is enabled while the feature item is available; and disabling a first feature item in the feature item set in response to an availability indicator of the first feature item indicating that the first feature item is unavailable.

16. The computer program product according to claim 15, wherein disabling the first feature item comprises:

disabling the first feature item in response to a status indicator of the first feature item indicating that the first feature item is disabled.

17. The computer program product according to claim 15, wherein the feature item further comprises an application programming interface (API) rule, and the API rule indicates part of a microservice corresponding to the feature item, and wherein disabling the first feature item comprises: disabling part of a first microservice corresponding to the first feature item according to the API rule of the first feature item.

18. The computer program product according to claim 15, wherein the first feature item further comprises an association indicator indicating that the first feature item is associated with a corresponding first microservice, and wherein disabling the first feature item comprises: disabling the first microservice.

19. The computer program product according to claim 15, wherein loading the feature item set comprises:

acquiring license information for the multiple microservices;

determining, based on the license information, availability indicators in the feature item set; and determining the status indicators in the feature item set based on cached data for the feature item set.

20. The computer program product according to claim 15, wherein a second feature item in the feature item set comprises one or more dependency indicators that indicate one or more upper-level feature items on which the second feature item depends, and the actions further comprise:

determining, in response to receiving a request to transition the second feature item from disabled to enabled, whether an availability indicator of the second feature item indicates available;

determining, in response to determining that the availability indicator of the second feature item indicates available, whether status indicators of the one or more upper-level feature items all indicate enabled; and enabling the second feature item in response to determining that the status indicators of the one or more upper-level feature items all indicate enabled.

* * * * *